United States Patent
Kronschnabl et al.

(10) Patent No.: US 9,856,784 B2
(45) Date of Patent: Jan. 2, 2018

(54) EXHAUST-GAS TURBOCHARGER HAVING A WASTEGATE VALVE AND HAVING AN OVERRUN AIR RECIRCULATION VALVE

(71) Applicant: CONTINENTAL AUTOMOTIVE GMBH, Hannover (DE)

(72) Inventors: Florian Kronschnabl, Regensburg (DE); Roland Herfurth, Regensburg (DE); Christoph Sparrer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 519 days.

(21) Appl. No.: 14/385,173

(22) PCT Filed: Mar. 7, 2013

(86) PCT No.: PCT/EP2013/054572
§ 371 (c)(1),
(2) Date: Sep. 15, 2014

(87) PCT Pub. No.: WO2013/135548
PCT Pub. Date: Sep. 19, 2013

(65) Prior Publication Data
US 2015/0098803 A1   Apr. 9, 2015

(30) Foreign Application Priority Data

Mar. 13, 2012 (DE) ........................ 10 2012 203 849

(51) Int. Cl.
*F02B 37/16*  (2006.01)
*F02B 37/18*  (2006.01)
*F04D 27/00*  (2006.01)

(52) U.S. Cl.
CPC ............ *F02B 37/183* (2013.01); *F02B 37/16* (2013.01); *F02B 37/186* (2013.01); *F04D 27/009* (2013.01); *Y02T 10/144* (2013.01)

(58) Field of Classification Search
CPC ........ F02B 37/16; F02B 37/18; F02B 37/183; F02B 37/186; F04D 27/009
See application file for complete search history.

(56) References Cited

U.S. PATENT DOCUMENTS

| 1,758,419 | A | | 5/1930 | Wheaton |
| 3,174,275 | A | | 3/1965 | Collin |
| 4,508,143 | A | | 4/1985 | Ogasawara |
| 4,893,474 | A | * | 1/1990 | Miller ..................... F02B 37/18 60/602 |
| 6,543,228 | B2 | * | 4/2003 | Deacon ................. F02B 37/183 137/527 |

(Continued)

FOREIGN PATENT DOCUMENTS

| CN | 1022216631 A | 10/2011 |
| CN | 102245869 A | 11/2011 |

(Continued)

*Primary Examiner* — Christopher Verdier
*Assistant Examiner* — Christopher R Legendre
(74) *Attorney, Agent, or Firm* — Laurence A. Greenberg; Werner H. Stemer; Ralph E. Locher

(57) ABSTRACT

An exhaust turbocharger has a wastegate valve and a thrust circulation valve, which can be actuated by a single, common actuator. The actuation of the thrust circulation valve is dependent on the positioning velocity of the actuator.

11 Claims, 5 Drawing Sheets

(56) References Cited

U.S. PATENT DOCUMENTS

| | | | |
|---|---|---|---|
| 8,630,787 B2* | 1/2014 | Shutty | F02D 35/027 |
| | | | 123/568.21 |
| 8,794,917 B2 | 8/2014 | Boening et al. | |
| 9,181,834 B2 | 11/2015 | Fokkelman et al. | |
| 2015/0098803 A1* | 4/2015 | Kronschnabl | F02B 37/16 |
| | | | 415/145 |

FOREIGN PATENT DOCUMENTS

| | | |
|---|---|---|
| DE | 2207221 A1 | 9/1973 |
| DE | 3240027 A1 | 7/1983 |
| DE | 10235531 A1 | 2/2004 |
| DE | 102008036637 A1 | 2/2010 |
| DE | 102008045871 A1 | 3/2010 |
| JP | S6116230 A | 1/1986 |

* cited by examiner

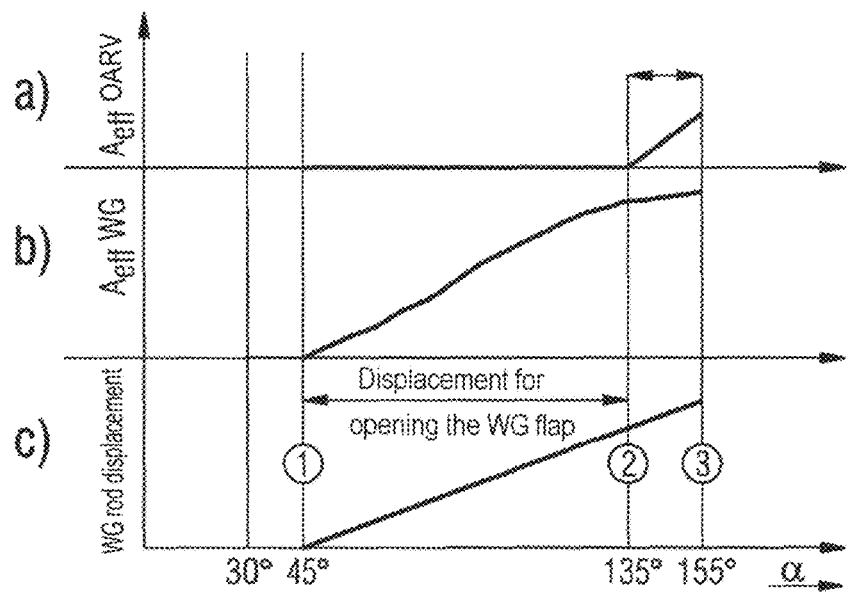
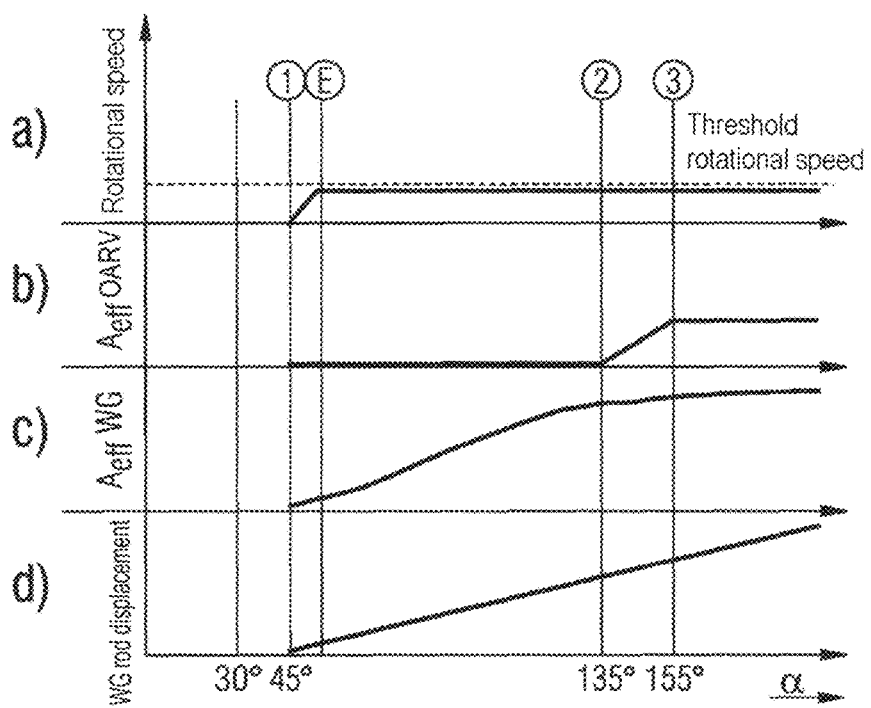

EXHAUST-GAS TURBOCHARGER HAVING A WASTEGATE VALVE AND HAVING AN OVERRUN AIR RECIRCULATION VALVE

BACKGROUND OF THE INVENTION

Field of the Invention

The invention relates to an exhaust-gas turbocharger which has a wastegate valve and an overrun air recirculation valve.

An internal combustion engine that is supercharged by an exhaust-gas turbocharger is characterized by the following arrangement for the guidance of fresh air and exhaust gas:

During normal supercharged operation, the exhaust gas from the internal combustion engine flows into a turbine and sets the turbine wheel thereof in rotation. Since the turbine wheel is connected via a common shaft to the compressor wheel of the exhaust-gas turbocharger, the compressor wheel likewise rotates and compresses the air in the intake tract upstream of the inlet into the internal combustion engine. In this way, more fuel can be admixed per cylinder stroke. The torque of the internal combustion engine is increased in this way. This operating state is illustrated in FIG. 1. Said figure shows the turbine 1, the wastegate valve 2, the shaft 3, the compressor 4, the overrun air recirculation valve 5, the throttle flap 6 and the internal combustion engine 7. It can be seen that the wastegate valve 2 is closed, the overrun air recirculation valve 5 is closed and the throttle flap 6 is fully open. Regulation of the supercharging can be performed by virtue of a part of the exhaust-gas mass flow being conducted through the wastegate valve, past the turbine wheel.

It is pointed out that, in FIG. 1, for clarity, some of the elements for the air guidance are not shown. These include, for example, an air filter arranged upstream of the compressor, an air mass sensor arranged upstream of the compressor, a charge-air cooler arranged downstream of the compressor, a tank/crankcase ventilation means arranged downstream of the throttle flap, and a catalytic converter arranged downstream of the turbine. An exhaust-gas recirculation arrangement that may be provided, or a secondary air injection means, have also been omitted from the illustration.

If, proceeding from this state, the driver releases the accelerator pedal, the internal combustion engine transitions from supercharged operation to throttled operation or overrun operation. Here, the wastegate valve 2 is opened and the throttle flap 6 is closed. The rotor of the exhaust-gas turbocharger initially continues to rotate at high speed owing to its mass inertia and owing to the fact that the opening behavior of the wastegate valve exhibits a finite speed, such that the compressor continues to deliver fresh air. If the compressor continues to impart a delivery action but the internal combustion engine receives less fresh air than in the previous operating state, the pressure downstream of the compressor will increase as the air mass flow decreases.

FIG. 3 shows the characteristic map of a compressor of an exhaust-gas turbocharger. Here, the mass flow MS is plotted along the abscissa, and the pressure ratio PQ is plotted along the ordinate. PG denotes the surge line, and SG denotes the choke line. IDL indicates lines of equal rotation speed.

It can be seen from FIG. 3 that the stable operation of a compressor in the range of low throughputs is limited by the surge line PG. When the surge line is overshot, the compressor is no longer capable of imparting a delivery action counter to the high pressure level. The air that is backed up flows back across the compressor, this being referred to as surging. This compressor surging should be avoided because the pressure fluctuations that arise lead to intense mechanical loading. Furthermore, the surging generates an unpleasant noise.

To prevent the surging of the compressor in the described situation, it is possible for compressed fresh air to be blown off downstream of the compressor via the overrun air recirculation valve. In order that the measurement by the air mass sensor is not falsified, it is advantageous for the air that is blown off to be introduced into the intake tract upstream of the compressor again, such that the compressor delivers the air in a circuit. If the transition into throttled engine operation is of only a short duration, for example in the range from one to two seconds, as is the case during a gearshift process, then upon a subsequent renewed demand for high torque from the engine, the overrun air recirculation valve and the wastegate valve are closed again. During this short duration, the rotor of the exhaust-gas turbocharger approximately maintains its rotational speed and attains the demanded charge pressure level very quickly again after the clutch engagement process.

FIG. 2 illustrates this throttled operation, or overrun operation. Said figure shows that the wastegate valve is open, the overrun air recirculation valve 5 is likewise open, and the throttle flap 6 is closed.

It is known for the wastegate valve to be actuated by means of a dedicated actuator assigned to the wastegate valve. Furthermore, it is also known for the overrun air recirculation valve to be actuated by means of a dedicated actuator assigned to the overrun air recirculation valve. The positioning element of the wastegate valve and the positioning element of the overrun air recirculation valve are activated in each case individually by means of a dedicated supply line, which may operate electrically or pneumatically. This entails not only high costs but also disadvantages with regard to the packaging of the exhaust-gas turbocharger, because the actuators must be attached to the turbocharger and thus increase the structural space taken up by the exhaust-gas turbocharger in the engine bay.

DE 10 2008 045 871 A1 discloses a turbocharger which has a wastegate valve and an overrun air recirculation valve, wherein the overrun air recirculation valve and the wastegate valve can be operated by means of a single positioning unit, and wherein the wastegate valve and the overrun air recirculation valve can be mechanically coupled by means of a connecting element.

BRIEF SUMMARY OF THE INVENTION

It is the object of the invention to specify a further improved exhaust-gas turbocharger.

Said object is achieved by means of an exhaust-gas turbocharger as claimed. Advantageous embodiments and refinements of the invention are specified in the dependent claims.

An exhaust-gas turbocharger according to the invention has a wastegate valve and an overrun air recirculation valve which are both actuated by a single common actuator, wherein the actuation of the overrun air recirculation valve is dependent on the positioning speed of the actuator.

This gives rise to the following advantages: cost advantages are obtained owing to the fact that only a single positioner, with corresponding activation, is required. The combination of two positioners to form a single positioner results not only in the cost advantage but also in a reduced space requirement. Said single positioner is supplied with a single form of energy, for example electricity. In relation to a supercharger with an electric wastegate positioner and pneumatically controlled overrun air recirculation valve, the complexity of the activation is reduced, because only a single supply medium is used. An electric positioner for actuating the wastegate valve generally has a position sensor. Owing to the coupled kinematic arrangement according to the invention, said position sensor may also be utilized for determining the position of the overrun air recirculation valve. This advantageously yields an additional fault diagnosis facility.

Figure 1:
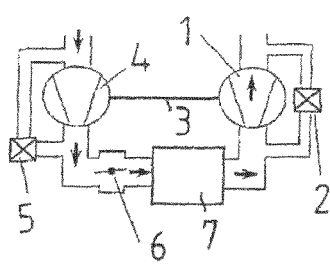
FIG. 1 is a diagrammatic view of a turbocharger in an exhaust gas tract in compressor operation.
Figure 2:
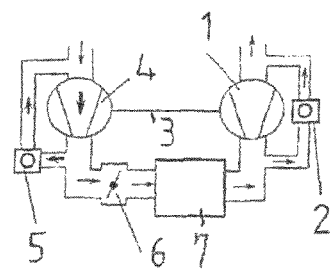
FIG. 2 is a similar view showing the system in a throttled or overrun operating state.
Figure 3:
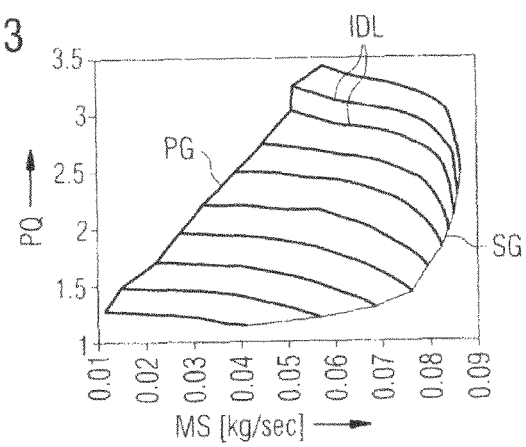
FIG. 3 is a characteristic map of a compressor of an exhaust-gas supercharger.
Figure 4:
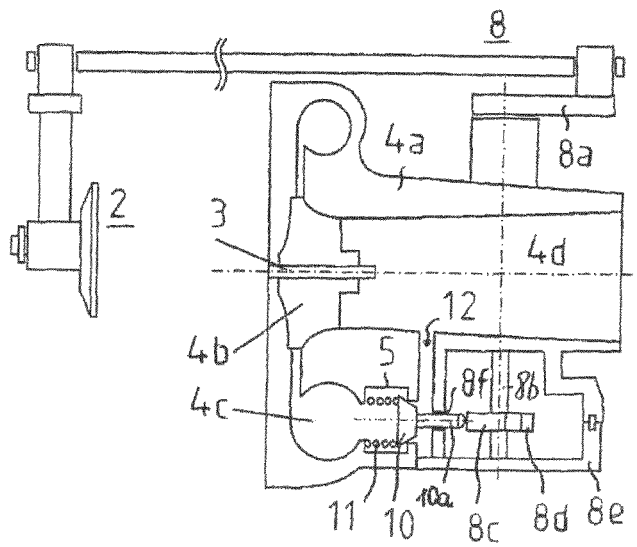
Figure 5:
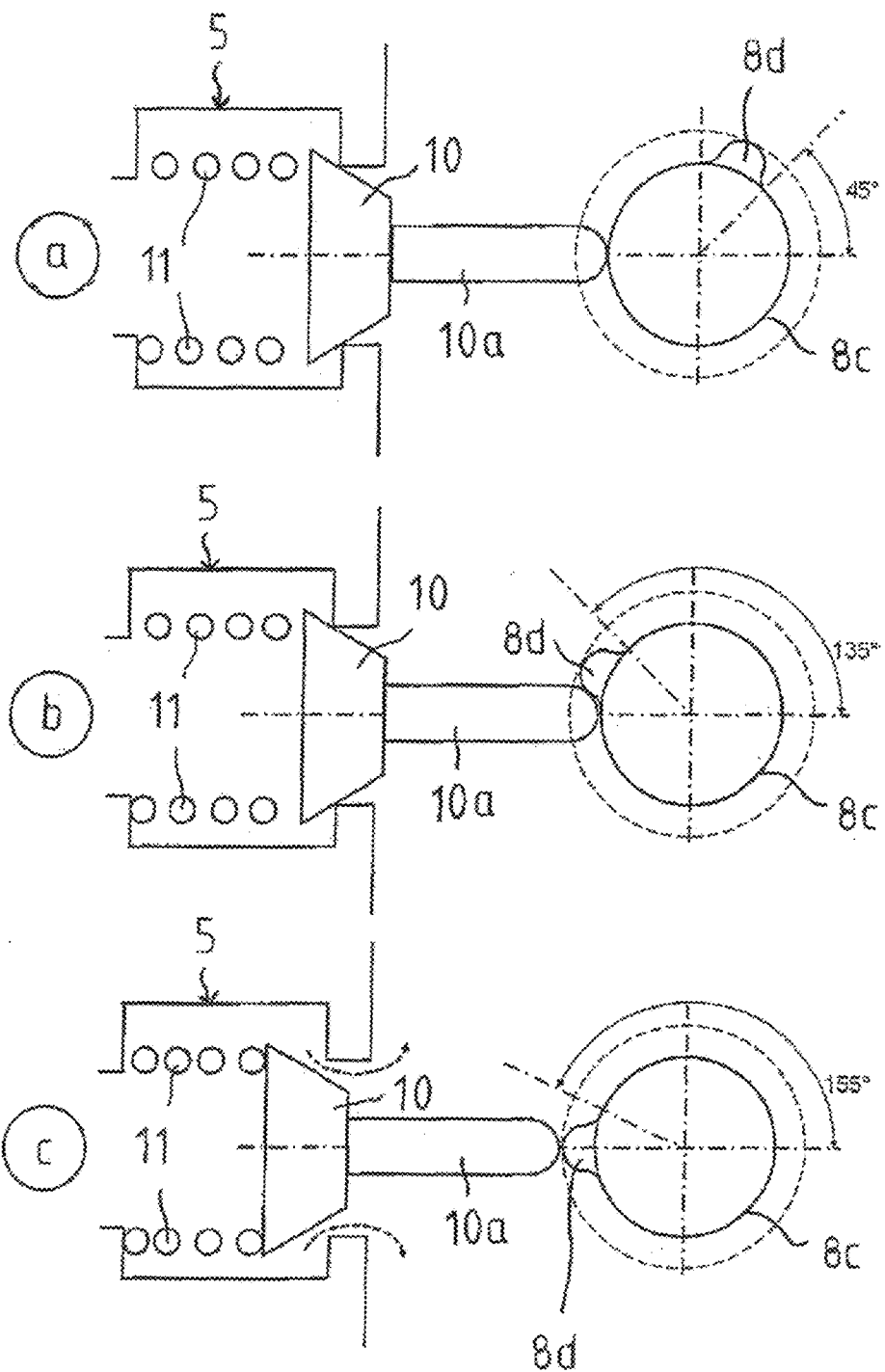
Figure 7:
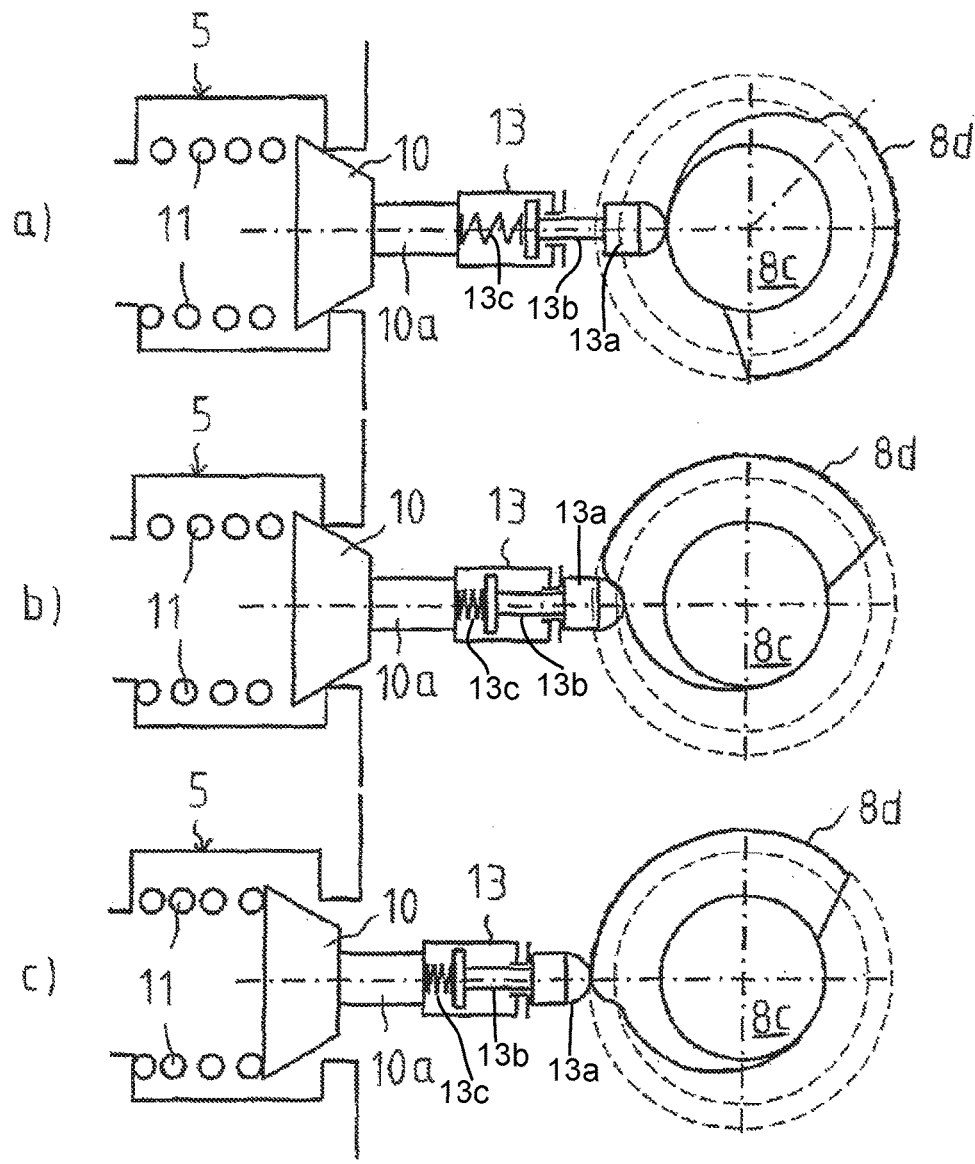
Figure 9:
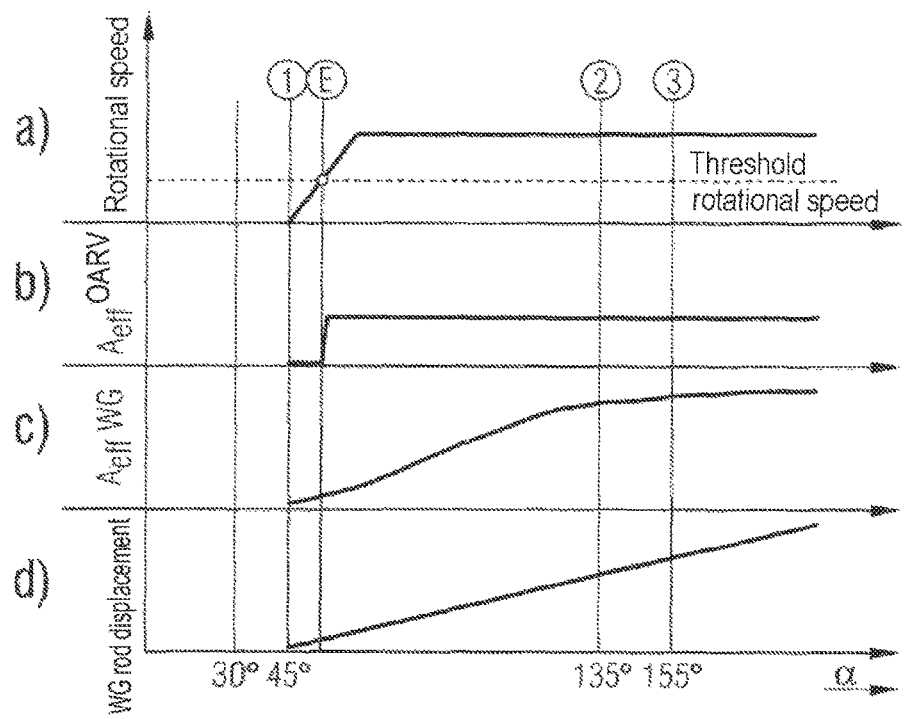
Figure 10:
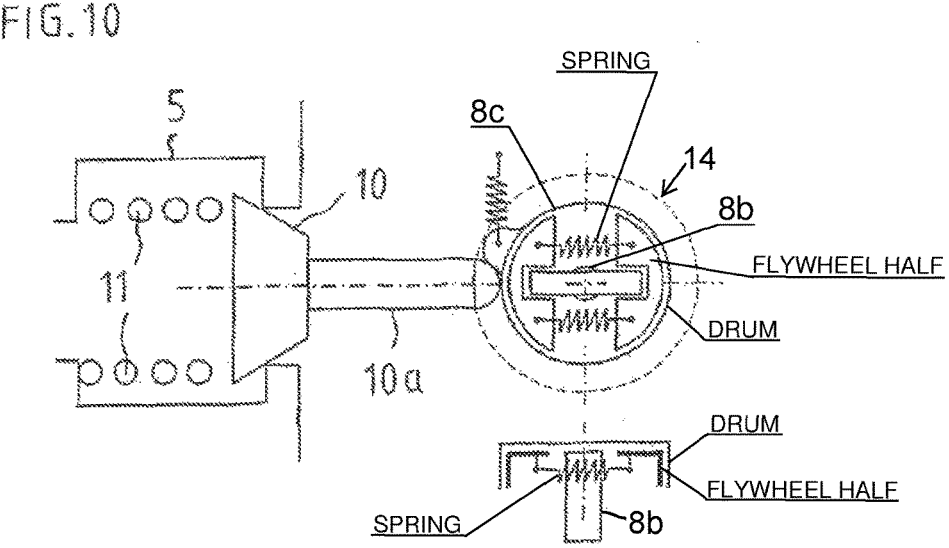

Further advantageous characteristics of the invention will emerge from the explanation thereof below on the basis of the further drawings, in which:

FIG. 4 is a sectional illustration of the compressor housing of an exhaust-gas turbocharger with integrated electric positioner and with an overrun air recirculation valve, FIG. 5 shows illustrations of the cam disk shown in FIG. 4, in three different angular positions of the drive output shaft of the actuator, FIG. 6 shows diagrams illustrating the relationship between the actuator angle and the opening behavior of the wastegate valve and of the overrun air recirculation valve, FIG. 7 shows illustrations of an overrun air recirculation valve coupled to the actuator via a damper, in three different angular positions of the drive output shaft of the actuator, FIG. 8 shows diagrams illustrating the relationship between the actuator angle and the opening behavior of the wastegate valve and of the overrun air recirculation valve in the case of a low positioning speed, FIG. 9 shows diagrams illustrating the relationship between the actuator angle and the opening behavior of the wastegate valve and of the overrun air recirculation valve in the case of a high positioning speed, and FIG. 10 is an illustration showing the coupling of the activation of the wastegate valve and of the overrun air recirculation valve by means of a centrifugal clutch.

DESCRIPTION OF THE INVENTION

FIG. 4 is a schematic sectional illustration of the compressor housing 4a of an exhaust-gas turbocharger with integrated electric positioner 8 and with an overrun air recirculation valve 5. The compressor housing 4a has a compressor wheel 4b, an outlet region 4c arranged downstream of the compressor wheel, and an inlet region 4d arranged upstream of the compressor wheel. Air to be compressed is supplied to the compressor wheel through the inlet region 4d. The air which is compressed by the compressor wheel, and which is supplied to the internal combustion engine, is present in the outlet region 4c. The outlet region 4c is connected to an overrun air recirculation valve 5. When the overrun air recirculation valve 5 is in the open state, compressed air from the outlet region 4c is recirculated through the overrun air recirculation valve 5 and through a return flow duct 12 into the inlet region 4d of the compressor housing 4a.

For the closure of the overrun air recirculation valve 5, a plunger 10 is provided which is coupled to a compression spring 11 and which has a linear projection 10a which is guided through an aperture 8f in a cover 8e of a positioner 8 that serves as actuator. A seal is provided between the aperture 8f and the linear projection 10a.

The plunger 10 is operatively connected, by way of its linear projection 10a, to a disk 8c, wherein a cam 8d is provided on the outer surface of said disk. The disk 8c is connected rotationally conjointly to the drive output shaft 8b of the electric positioner 8.

The electric positioner 8 is furthermore connected to a cover of a wastegate valve 2 provided on the turbine housing of the exhaust-gas turbocharger in order to close or open the wastegate valve as required.

Consequently, in the exemplary embodiment shown, the wastegate valve and the overrun air recirculation valve of the exhaust-gas turbocharger can be actuated by a single common actuator.

FIG. 5 shows illustrations of the disk 8c shown in FIG. 4, in three different angular positions of the drive output shaft of the actuator. Accordingly, the disk 8c is shown in an angular position of 45° in FIG. 5a and in an angular position of 135° in FIG. 5b. In the angle range between 45° and 135°, the wastegate valve opens, wherein the overrun air recirculation valve remains in the closed state. Beyond an angular position of 135°, not only the wastegate valve but also the overrun air recirculation valve is opened. Here, FIG. 5c shows an angular position of 155°, in which the cam 8d provided on the outer circumference of the disk 8c has pushed the linear projection 10a of the plunger 10 and thus also the plunger 10 itself to the left in the figure, such that the overrun air recirculation valve 5 is in the open state.

FIG. 6 shows diagrams illustrating the relationship between the actuator angle and the opening behavior of the wastegate valve and of the overrun air recirculation valve. Here, FIG. 6a shows the opening behavior of the overrun air recirculation valve, FIG. 6b shows the opening behavior of the wastegate valve, and FIG. 6c shows the rod displacement of the control rod of the actuator, wherein in each case, the angle of rotation a of the drive output shaft of the actuator is plotted along the abscissa. It can be seen that, between the angular position 1 (45°) and the angular position 2 (135°), only the opening position of the wastegate valve changes, whereas the overrun air recirculation valve remains closed. Only when the angle of rotation a of the drive output shaft of the actuator exceeds 135°, that is to say between the angular position 2 (135°) and the angular position 3 (155°), is the overrun air recirculation valve also opened.

The kinematic dependency explained on the basis of FIG. 6 has the disadvantage, however, that an opening of the overrun air recirculation valve is possible only after the wastegate valve has fully opened. To eliminate this disadvantage and to make it possible for the overrun air recirculation valve and the wastegate valve to be opened simultaneously if required, the overrun air recirculation valve is advantageously coupled to the actuator via a damper or a centrifugal clutch. In this way, the overrun air recirculation valve can be actuated in a manner dependent on the positioning speed of the actuator.

One possible embodiment is illustrated in FIG. 7. Said figure shows illustrations of an overrun air recirculation valve coupled to the actuator via a damper 13, in three different angular positions of the drive output shaft of the actuator. Accordingly, in the angular positions shown in FIGS. 7a and 7b, the overrun air recirculation valve is situated in the closed state in each case. In the angular position shown in FIG. 7c, the overrun air recirculation valve is in the open state. The damper 13 shown in FIGS. 7a, 7b and 7c is a linear damper, which includes a cam follower element 13a, a push rod 13b and a biasing spring 13c for biasing the cam follower element 13a against the cam surface of the cam 8d.

FIG. 8 shows diagrams illustrating the relationship between the actuator angle and the opening behavior of the wastegate valve and of the overrun air recirculation valve in the case of a low positioning speed of the actuator. Here, FIG. 8a shows the rotational speed of the drive output shaft of the actuator, FIG. 8b shows the opening behavior of the overrun air recirculation valve, FIG. 8c shows the opening behavior of the wastegate valve, and FIG. 8d shows the rod displacement of the control rod of the actuator, wherein in each case, the angle of rotation a of the drive output shaft of the actuator is plotted along the abscissa.

It can be seen that, when the wastegate valve, proceeding from the closed position, is opened slowly, that is to say with a rotational speed of the drive output shaft lower than a threshold rotational speed of the drive output shaft, only a low force is transmitted to the plunger 10 via the damper 13. Said low force is not sufficient to open the overrun air recirculation valve.

FIG. 9 shows diagrams illustrating the relationship between the actuator angle and the opening behavior of the wastegate valve and of the overrun air recirculation valve in the case of a high positioning speed of the actuator. Here, FIG. 9a shows the rotational speed of the drive output shaft of the actuator, FIG. 9b shows the opening behavior of the overrun air recirculation valve, FIG. 9c shows the opening behavior of the wastegate valve, and FIG. 9d shows the rod displacement of the control rod of the actuator, wherein in each case, the angle of rotation a of the drive output shaft of the actuator is plotted along the abscissa.

It can be seen that, when the wastegate valve, proceeding from the closed position, is opened quickly, that is to say with a rotational speed of the drive output shaft higher than a threshold rotational speed of the drive output shaft, a force is transmitted via the damper 13 which is high enough to open the overrun air recirculation valve counter to the spring preload. In this way, it is possible for the wastegate valve and the overrun air recirculation valve to be opened simultaneously proceeding from any position of the wastegate valve. Here, it is advantageously possible for the overrun air recirculation valve, in the end position of the positioner, to be held open by the disk equipped with a cam.

FIG. 10 is an illustration showing the coupling of the activation of the wastegate valve and of the overrun air recirculation valve by means of a centrifugal clutch 14. By means of a centrifugal clutch 14 of said type, it is also possible to realize behavior as has been explained on the basis of FIGS. 8 and 9, that is to say to realize actuation of the overrun air recirculation valve in a manner dependent on the positioning speed of the actuator. The faster the output shaft 8b rotates, the faster the flywheel halves are pushed radially outwardly against the action of the two illustrated springs and to come into frictional contact with the inside walls of the drum, which causes the drum and its attached cam disc to rotate.

Further alternative embodiments of the invention can be realized by virtue of a linear positioner being used instead of a rotary positioner. It is likewise possible for a rotary damper to be used instead of a linear damper.

The invention claimed is:

1. An exhaust-gas turbocharger, comprising:
a wastegate valve and an overrun air recirculation valve;
a single, common actuator configured to actuate said wastegate valve and said overrun air recirculation valve;
wherein an actuation of said overrun air recirculation valve is dependent on a positioning speed of said actuator so that, when said wastegate valve opens at a first speed, said overrun air recirculation valve is not immediately opened and, when said wastegate valve opens at a second speed greater than the first speed, said overrun air recirculation valve opens together with said wastegate valve.

2. The exhaust-gas turbocharger according to claim 1, which comprises a damper coupling said overrun air recirculation valve to said actuator.

3. The exhaust-gas turbocharger according to claim 2, wherein said damper is a linear damper.

4. The exhaust-gas turbocharger according to claim 1, wherein said actuator comprises a centrifugal clutch for actuating said overrun air recirculation valve.

5. The exhaust-gas turbocharger according to claim 1, wherein said actuator is configured to actuate said wastegate valve and said overrun air recirculation valve simultaneously.

6. The exhaust-gas turbocharger according to claim 1, wherein said actuator is configured to actuate said wastegate valve and said overrun air recirculation valve at different times.

7. The exhaust-gas turbocharger according to claim 1, wherein said actuator has an electric positioning device.

8. The exhaust-gas turbocharger according to claim 1, wherein said actuator has a drive output shaft coupled to a drive output lever, a disk disposed on said drive output shaft, and said disk has a radially outer surface formed with a cam.

9. The exhaust-gas turbocharger according to claim 8, which comprises a plunger disposed for actuation by said cam on said disk, wherein said cam actuates said plunger for opening said overrun air recirculation valve.

10. An exhaust-gas turbocharger, comprising:
a wastegate valve and an overrun air recirculation valve;
a single, common actuator configured to actuate said wastegate valve and said overrun air recirculation valve;
said actuator including a centrifugal clutch connected between said wastegate valve and said overrun air recirculation valve and configured to cause an actuation of said overrun air recirculation valve to be dependent on a positioning speed of said actuator.

11. An exhaust-gas turbocharger, comprising:
a wastegate valve and an overrun air recirculation valve;
a single, common actuator configured to actuate said wastegate valve and said overrun air recirculation valve;
said actuator including a positioner, a rotary shaft connected to said positioner and a disc with a cam mounted on said rotary shaft;
a damper disposed between said disc and said overrun air recirculation valve;
wherein said damper is configured to open said overrun air recirculation valve when said rotary shaft is rotated at a speed above a threshold rotational speed and said overrun air recirculation valve remains closed when said rotary shaft is rotated at a speed below the threshold rotational speed.

* * * * *